United States Patent [19]
Tomlinson

[11] Patent Number: 5,935,554
[45] Date of Patent: *Aug. 10, 1999

[54] CONCENTRATED AEROSOL SPACE SPRAY THAT IS NOT AN EMULSION

[75] Inventor: Roderick Peter John Tomlinson, Rowville, Australia

[73] Assignee: Soltec Research Pty. Ltd., Rowville, Australia

[ * ] Notice: This patent is subject to a terminal disclaimer.

[21] Appl. No.: 08/835,583

[22] Filed: Apr. 9, 1997

Related U.S. Application Data

[62] Continuation of application No. 08/582,152, Jan. 2, 1996, abandoned, which is a continuation-in-part of application No. 07/983,520, filed as application No. PCT/AU91/00039, Aug. 21, 1991.

[30] Foreign Application Priority Data

Sep. 3, 1990 [AU] Australia ................ PK2089

[51] Int. Cl.⁶ .................................................. A61K 9/12
[52] U.S. Cl. ............................ 424/45; 424/47; 424/76.1; 424/76.5; 424/405; 424/DIG. 10; 514/919
[58] Field of Search ................. 424/76.1, 76.5, 424/405, DIG. 10, 43, 45; 514/937, 945, 919

[56] References Cited

U.S. PATENT DOCUMENTS

| | | | |
|---|---|---|---|
| 2,070,167 | 2/1937 | Iddings | 167/13 |
| 2,321,023 | 6/1943 | Goodhue et al. | 167/22 |
| 2,524,590 | 10/1950 | Boe | 252/305 |
| 3,159,535 | 12/1964 | Sesso et al. | 424/45 |
| 3,756,472 | 9/1973 | Vos | 222/189 |
| 4,083,954 | 4/1978 | Tsuchiya et al. | 424/47 |
| 4,174,386 | 11/1979 | Spitzer et al. | 424/47 |
| 4,439,342 | 3/1984 | Albanese | 252/305 |
| 4,740,366 | 4/1988 | Winston et al. | 424/45 |
| 4,826,674 | 5/1989 | Albanese | 424/45 |
| 4,851,212 | 7/1989 | Winston et al. | 424/45 |
| 4,904,464 | 2/1990 | Albanese | 424/45 |
| 4,923,897 | 5/1990 | Flashinski | 424/45 |
| 4,981,678 | 1/1991 | Tomlinson | 514/945 |
| 5,094,853 | 3/1992 | Hagarty | 424/405 |
| 5,516,504 | 5/1996 | Tomlinson | 424/47 |

FOREIGN PATENT DOCUMENTS

| | | |
|---|---|---|
| 512912 | 1/1977 | Australia . |
| 58959/80 | 6/1980 | Australia . |
| 594736 | 7/1987 | Australia . |
| 1106329 | 8/1981 | Canada . |
| 0125471 | 11/1984 | European Pat. Off. . |
| 5379928 | 7/1978 | Japan . |
| 78-044494 | 11/1978 | Japan . |
| 59-064688 | 4/1984 | Japan . |
| 63-137981 | 6/1988 | Japan . |
| 2-024382 | 1/1990 | Japan . |
| 2-069407 | 3/1990 | Japan . |
| 166861 | 12/1964 | U.S.S.R. . |

*Primary Examiner*—Raj Bawa
*Attorney, Agent, or Firm*—Synnestvedt & Lechner LLP

[57] ABSTRACT

A dispenser for space spraying an aerosol composition comprising a container for containing the aerosol composition and a metering device for space spraying a metered amount of he composition. The composition comprises active ingredient and propellant wherein the propellant is dissolved in the active ingredient. In preferred form, the composition comprises a non-aqueous solution containing 10–85% w/w active ingredient, 1–25% w/w co-solvent and 15–80% w/w propellant.

26 Claims, No Drawings

CONCENTRATED AEROSOL SPACE SPRAY THAT IS NOT AN EMULSION

CROSS-REFERENCE TO RELATED APPLICATIONS

This application is a continuation of U.S. application Ser. No. 08/582,152 filed Jan. 2, 1996 (now abandoned) as a continuation-in-part of U.S. application Ser. No. 07/983,520, filed on Mar. 3, 1993, the now U.S. Pat. No. 5,516,504, issued May 14, 1996, which application was U.S. National stage application of PCT/AU91/0039, filed on Aug. 21, 1991, which application claims priority from Australian Application No. PK2098, filed on Sep. 30, 1990.

FIELD OF THE INVENTION

The invention relates to an aerosol space spray containing ultra high concentrations of active ingredients.

Throughout this specification the term "space spray" will be used to define aerosol formulations used for dispersion of an active ingredient in the air as opposed to aerosol formulations which are used to apply an active ingredient to a surface, e.g. antiperspirants, polishes, surface disinfectants, etc.

DESCRIPTION RELATIVE TO THE PRIOR ART

Aerosol formulations have been known for at least 50 years in the art of aerial dispersion of insecticides, air fresheners and other active ingredients.

Conventionally, to obtain the desired characteristics of an aerosol for dispersion into the air, the formulations contain minimal active ingredients, a solvent for the active ingredient and a suitable propellant. The active ingredient usually constitutes less than 1% w/w. The solvent is present in the order of 10–20% w/w and the propellant constitutes 80–90% w/w. In most cases of such aerosol formulations, the solvent is a hydrocarbon solvent and the propellant a fluorocarbon or hydrocarbon. Alternatively, the propellant is partially substituted with water, wherein the weight percentage being water is in the range of 30–40% w/w. Therefore it is evident that to deliver one gram of insecticide conventionally requires the release to the atmosphere of between 80 and 250 g of volatile organic compounds (VOC's). Volatile organic compound (VOC) is the general name given for compounds with an appreciable vapor pressure, for example, fluorocarbons, hydrocarbons, e.g. butane, etc., commonly used as propellants.

In surface applications dispersal of the active ingredient of the aerosol over a large area and suspension of the active ingredient in particle form in the atmosphere are not vital to the efficacy of the formulation. In many surface sprays it is important that the active ingredient contact the surface in high concentrations and often for a lengthy period of time—this is particularly important in the case of disinfectants, deodorants and antiperspirants, for example. Accordingly, and in general, aerosol surface sprays containing high amounts of active ingredient are known.

CA 1106329 (BRISTOL-MYERS COMPANY) discloses an antiperspirant formulation, a surface spray, comprising about 20–50% w/w of a solid antiperspirant material suspended in about 20–50% w/w of an appropriate oil. About 20–50% w/w of an appropriate propellant is also present in addition to a suspending agent and other adjuvants. In this formulation, the solid active ingredient is suspended in the oil which in turn is suspended throughout the propellant.

Another type of aerosol surface spray is disclosed in JP 78044494 ((TOKA-) TOKYO AEROSOL KAGAKU KAISHA) wherein 65–85 vol % of raw paint liquid, 35–15 vol % of a propellant and a solvent containing not less than 55 vol % (with respect to the paint) of acetone are combined together. The paint is solubilized by the solvent and in turn dissolved in the propellant.

An attempt to increase the amount of powdered solid active ingredient in an aerosol composition was described in AU 512912. In the formulation described, at least 15% of powdered solid active ingredient is dispersed in an emulsion of water and an anhydrous carrier. Then there is added to this dispersion an anhydrous condensed hydrocarbon aerosol propellant gas miscible with the anhydrous carrier so that a final emulsion in which the active ingredient is dispersed is formed. It will be understood that, as in the prior art outlined hereinabove, the active ingredient in this formulation is dispersed or dissolved throughout the propellant. A stated result of this composition is that smaller amounts of propellant gas are required than is conventional for aerosols of this type.

AU 594736 (CHURCH & DWIGHT CO. INC.) discloses an air deodorizer comprising an aerosol having as the dispersed phase, liquid droplets comprising 2–25% of a deodorizing agent. Fragrance may also be included in the deodorizer in an amount of up to 3% by weight of the solution. A propellant in an amount of 8–40% by weight of the resulting aerosol spray may be present as a means for dispersion of the deodorizer.

In a formulation described in AU-B-58959/80 a novel halogenated hydrocarbon is described for use as a solvent in aerosol sprays. More particularly, 10–89.5% of halogenated hydrocarbon as solvent is claimed in conjunction with 10–70% of liquified aerosol propellant and 0–75% of other organic solvents. Again it is clear that it is the function of the hydrocarbon and other solvents in this formulation to act as solvents of the active ingredient which is present in comparatively small amounts.

According to the prior art, especially that relating to insecticides, in order to solvate pyrethrins and synthetic pyrethroids and other insecticides sufficiently to provide break up energy to fully atomize the insecticide into fine atomized particle dispersions, it is clear that large amounts of propellant and solvents are required in proportion to the amount of active ingredient present in the total formulation.

It is apparent that, with the general trend around the world for manufacturers and producers to be more environmentally aware as a result of, primarily, government constraints and consumer demand, there is a real need to reduce the amounts of fluorocarbons, hydrocarbons and other VOC's released into the atmosphere since it is thought that they contribute significantly to atmospheric pollution.

Much research has been performed with the aim of finding a substitute propellant for the conventional fluorocarbon and hydrocarbon propellants. One example is the substitution of water for some of the hydrocarbons. However, a comparative substitute is yet to be found. With regard to the water substitute example, water based aerosols do function to disperse the active ingredient but generally not in sufficiently fine enough drops for adequate air dispersal. In such formulations the aerosolized particles will quickly fall out of the atmosphere resulting in a "rain" effect.

SUMMARY OF THE INVENTION

Accordingly, the present invention provides means, including an improved aerosol space spray, for ameliorating at least some of the disadvantages of the prior art.

More particularly, the present invention provides an improved aerosol space spray which requires less release of undesirable VOC's into the environment while still providing adequate dispersal of the active ingredient in the atmosphere. Most desirably, the present invention provides a space spray composition and container that substantially reduce the amount of VOC's required in, and released in each use by, an aerosol space spray.

To this end there is provided an aerosol composition for space spraying comprising a solution of at least one active ingredient and a propellant (and, optionally, solvent and one or more adjuvants), a substantial portion of said propellant being dissolved in said active ingredient.

In preferred form, there is provided an aerosol composition for space spraying comprising a solution of at least one active ingredient and propellant, a substantial portion of said propellant being dissolved in said active ingredient. Another preferred embodiment further comprises co-solvent, said propellant being dissolved in said active ingredient and cosolvent.

DETAILED DESCRIPTION OF THE INVENTION

Surprisingly, it has been found that, by providing a stable ultra concentrated aerosol, the percentage of undesirable VOC's required as propellants and solvents is dramatically decreased, resulting in less VOC release into the atmosphere. As an added benefit, as a result of the decreased requirement for VOCs, the size of the container used for the aerosol in commercial applications is substantially reduced, as is the volume of space spray required to achieve the desired effect. It will be appreciated that while in prior art space spray formulations the active ingredient is dissolved in the propellant component of the formulation, in the compositions according to the invention, a single phase is achieved by the propellant component being dissolved in the active ingredient.

The aerosol arrangement of the invention can be used in essentially any system wherein the active ingredient is to be dispersed into the air or is atomized. Preferably, the active ingredient is present in the formulation in an amount of about 10% to about 90% w/w, more preferably about 20% to about 85% w/w, along with suitable propellants, solvents and excipients or adjuvants. It should be noted that, as indicated above, some active ingredients, depending on their characteristics, may also be effective in formulations according to the invention in amounts less than 20% w/w.

In some situations, a cosolvent may be required in the aerosol composition, but, if present, its concentration in the composition generally will be in the range of 1–25% w/w.

In the aerosol compositions according to the invention, the active ingredients preferably act as solvents for the propellant and, therefore, the propellant will accordingly be chosen to suit the active ingredients. This invention is partly predicated on the discovery that even when a small amount of propellant is solvated in an insecticide, perfume or other active ingredient the resulting composition achieves effective space dispersion of the active ingredient when an aerosol dispenser in which it is disposed is operated in the conventional manner.

In the case of insecticides, most normal household insecticides are suitable for use in the dispensers of the invention. For example, pyrethrins or synthetic pyrethroids may preferably be used although other conventional insecticides may be envisaged within the scope of the invention.

In the case of air fresheners, again, most conventional perfumes will be suitable for use. Throughout this specification the term "perfume" means a pleasant smelling substance in the form of a solution of natural and/or synthetic odor concentrates, but which does not contain solvents as such. The perfume can preferably be used in pure form and as a result thereof an added advantage is lent to such air fresheners inasmuch as the fragrance quality is unadulterated by the presence of high quantities of solvents and emulsifiers present in conventional systems.

Propellants in accordance with the invention include fluorocarbons, hydrocarbons, hydrofluorocarbons, hydrochlorofluorocarbons, dimethyl ether and any other propellants regarded as suitable, and in particular, suitable for household aerosols.

Although not essential to the compositions of the invention, typical solvents which may be used include methylene chloride, 1,1,1-trichloroethane, ethanol, propanol; aromatic compounds such as toluene; glycol ethers such as carbitol; paraffin solvents such as hexane and petroleum solvent blends such as Shellsol T. However, as previously indicated, it is desirable to minimize and where possible obviate the need for these solvents.

In addition to the aforesaid ingredients, other auxiliary agents may be incorporated in the present composition, for example, anticorrosive agents, etc. and, in the case of an insecticide, fragrance. Preferably, these adjuvants are present in a quantity of 1–10% w/w. Suitable adjuvants may be perfumes, antioxidants such as BHT and BHA, and corrosion inhibitors such as cyclohexylaminenitrate.

Generally, it is envisaged that the aerosol will be used in a domestic situation and, thus, the aerosol container will meet the standard International pressure requirements.

It is realized that, due to the higher concentration of active ingredient, there would possibly be a tendency to spray excess active ingredient into the atmosphere. To circumvent this problem, in a second aspect of the invention, there is provided an improved dispenser for space spraying an aerosol composition consisting essentially of:

a) a container,
b) an aerosol composition disposed within said container, and
c) a metering device operatively connected to said container for space spraying a metered amount of said aerosol composition, the aerosol composition comprising a solution of an active ingredient and a propellant, a substantial portion of the propellant being dissolved in the active ingredient.

Stated otherwise, an aerosol metered valve is preferably incorporated with the aerosol of the present invention to overcome the aforementioned problem of over spraying.

A typical single use dosage, or discharge from the aerosol container, will be of the order of 5–500 mg. A more preferred dosage is of the order of 35–155 mg.

Preferably, because of the solvation characteristics of the active ingredients themselves, some specific polymers may be more desirably used as internal gaskets and metering devices in the dispensers of the invention than others. Such suitable polymers are preferably highly solvent resistant. Preferred metering valves for use in the invention may include a Valois DF10-150. Other possible valves may be supplied by COSTER, SEAQUIST or EMSON VALVES of the USA.

Preferably, the composition in either aspect of the invention comprises 10–90% w/w, more preferably 20–85% w/w, active ingredient and, correspondingly, 90–10% w/w, more preferably 80–15% w/w, propellant. If necessary, an additional solvent in an amount of up to 25% w/w (based on the total weight of the composition) may be present. Other adjuvants and excipients may also be present in an amount of up to 10% w/w, based on the total weight of the composition.

Suitable active ingredients, depending on the purpose of the space spray, propellants, solvents and excipients are outlined hereinabove.

In a further embodiment of the invention, there is provided a composition for use in a dispenser for space spraying comprising at least one propellant fully solvated in at least one active ingredient.

Preferably, such a composition comprises 90–10% w/w, more preferably 80–15% w/w, of a propellant which is fully solvated in 10–90% w/w, more preferably 20–85%, w/w active ingredient.

Compositions according to this aspect of the invention may additionally comprise up to 25% w/w cosolvent, the cosolvent also being fully solvated in at least one active ingredient. Conveniently also included are up to 10% w/w of other suitable excipients or adjuvants.

Suitable active ingredients according to the application of the composition in accordance with this embodiment of the invention, suitable propellants, solvents and adjuvants are as described hereinabove.

In all aspects of this invention, the active ingredient in the defined range of the invention acts as the continuous phase wherein the propellant is dispersed or dissolved to form a single homogeneous phase.

At 25° C., pyrethrin is soluble at less than 1% w/w in hydrocarbon propellants and most perfumes are soluble in such propellants at less than 5% w/w. However, as will be shown, it has now been discovered that active ingredients for space sprays, such as pyrethrins, synthetic pyrethroids and perfumes, form a homogeneous solution across a broad range of concentration ratios with hydrocarbon propellant.

In the examples given hereinbelow, the propellant solubility at 20° C. is measured by observation on a sliding scale wherein "clear" indicates complete solubility of the propellant in the active ingredient, "slight haze" indicates the first visible indications of insolubility while "turbid" indicates substantial insolubility.

In commercial circumstances, compositions according to the instant invention which are "slightly hazy" may be effective as space sprays since, in these cases, substantial solvation of the propellant in the active ingredient is occurring. However, such compositions do not exhibit space spraying characteristics as ideal as those compositions in which no insolubility is visible. "Slightly hazy" formulations must still, however, be considered to be within the scope of the invention since a substantial portion of the composition comprises propellant solvated in the active ingredient, and they are effective as space spray compositions.

HCP58 hydrocarbon is considered representative of all hydrocarbons available for use as propellants in compositions of the type exemplified; hence its choice for the examples given hereinbelow.

In the experimental data given hereinbelow in which turbidity of the composition is measured, samples were packaged in glass aerosol containers in order that stability could be evaluated.

A. PERFUME EXAMPLES

In the case where the active ingredient is a perfume, the following examples illustrate the broad range of formulations possible within the scope of the invention.

Example A1
Perfume: 5286 GIVAUDAN
Propellant: HCP58 HYDROCARBON

| % w/w Perfume | % w/w Propellant | Propellant Solubility 20° C. |
| --- | --- | --- |
| 100 | 0 | clear |
| 90 | 10 | clear |
| 80 | 20 | clear |
| 70 | 30 | clear |
| 61 | 39 | clear |
| 60 | 40 | slight haze |
| 59 | 41 | slight haze |
| 58 | 42 | slight haze |
| 55 | 45 | slight haze |
| 50 | 50 | haze |
| 40 | 60 | turbid |
| 30 | 70 | turbid |
| 20 | 80 | turbid |
| 10 | 90 | turbid |
| 0 | 100 | clear |

It is evident that a concentration in excess of 40% of propellant will result in separation and precipitation of insoluble perfume components. Such insoluble components will probably lead to valve failure in the dispenser and are therefore undesirable, unless necessary, and to be avoided, if possible.

This example demonstrates that HCP58 propellant is fully soluble in the above perfume in the range of 61–90% w/w perfume and 39–10% w/w propellant. Substantial solubility, yielding only slightly hazy compositions, is sustained at concentrations up to 45% w/w propellant and, correspondingly, 55% w/w perfume. Accordingly, operable composition ranges for this combination of perfume and propellant are 55–90% w/w perfume and, correspondingly, 45–10% w/w propellant, a range of 61–85% w/w perfume and 39–15% w/w propellant being preferred for complete clarity and ample expansive energy of the aerosol solution. Thus, it is generally preferred that at least 15% w/w of propellant be present in the compositions in order to assure that sufficient expansive energy is provided for releasing the active ingredient when the aerosol valve is actuated.

These weight ranges can be compared with prior art aerosol fragrances wherein levels above approximately 0.5% of fragrances are not used due to the insolubility of the fragrance in the propellant.

Example A2
Perfume: NOUVELLE 301
Propellant: HCP58 HYDROCARBON

| % w/w Perfume | % w/w Propellant | Propellant Solubility 20° C. |
| --- | --- | --- |
| 100 | 0 | clear |
| 90 | 10 | clear |
| 80 | 20 | clear |
| 70 | 30 | clear |
| 65 | 35 | clear |
| 60 | 40 | clear |
| 59 | 41 | clear |
| 58 | 42 | slightly turbid |
| 55 | 45 | turbid |
| 50 | 50 | turbid |
| 40 | 60 | turbid |
| 30 | 70 | turbid |
| 20 | 80 | turbid |
| 10 | 90 | turbid |
| 0 | 100 | clear |

Again, it is evident that a composition comprised of 58–90% w/w, preferably 58–85% w/w of NOUVELLE 301, perfume and 42–10% w/w, preferably 42–15% w/w HCP58, propellant will be homogenous and thus suitable for use.

Example A3

In this example, the effect of the addition of a cosolvent upon the compositions according to the invention was tested.

Perfume: NOUVELLE 301
Propellant: HCP58 HYDROCARBON
Cosolvent: Ethanol

| % w/w Perfume | % w/w Propellant | % w/w Cosolvent | Solubility at 20° C. |
|---|---|---|---|
| 20 | 65 | 15 | slightly turbid |
| 20 | 62 | 18 | slightly turbid |
| 20 | 61 | 19 | slightly turbid |
| 20 | 60 | 20 | clear |
| 20 | 55 | 25 | clear |
| 40 | 55 | 5 | slightly turbid |
| 40 | 53 | 7 | slightly turbid |
| 40 | 52 | 8 | slightly turbid |
| 40 | 51 | 9 | clear |
| 40 | 50 | 10 | clear |

Clearly, the active ingredient, NOUVELLE 301 perfume, is an effective substitute for solvents in the compositions of the invention; the higher the level of perfume (40% w/w vs. 20% w/w) the less solvent is required in order to form a single phase homogenous (clear) liquid. From a different viewpoint, the cosolvent enhances the capacity of a given amount of perfume to dissolve a given propellant. Conventionally, the active ingredient: propellant:cosolvent ratio is approximately 1:85:15, whereas in this embodiment of the present invention, the solution is quite clearly an homogenous solution in the ratio of approximately 1:1.25:0.25 (i.e., 40:50:10). While it is preferred to minimize the cosolvent content of the compositions of the invention, particularly where the active ingredient comprises perfume, it can also be seen that homogenous solutions are also obtained at active ingredient:propellant:cosolvent ratios of about 20:60:20 and even 20:55:25.

Further tests demonstrating the scope of the invention were made using varying fragrances and propellants, without and with cosolvents, as follows.

Example A4

Composition:
Fragrance: BBA Soft Fresh P5.0260
Propellant: P28 (propane/butane—28 psi at 21° C.)

| Mass Fragrance (g) | Mass (g) Propellant | Observations at 20° C. |
|---|---|---|
| 10.0 | — | clear |
| 9.0 | 1.0 | clear |
| 8.0 | 2.0 | clear |
| 7.0 | 3.0 | clear |
| 6.0 | 4.0 | clear |
| 5.0 | 5.0 | clear |
| 4.0 | 6.0 | clear |
| 3.0 | 7.0 | clear |
| 2.0 | 8.0 | clear |
| 1.0 | 9.0 | turbid |
| — | 10.0 | clear |

Example A5

Composition:

Fragrance (Perfume): as given

Propellant: P28 (propane/butane blend at 28 psi at 21° C.).

OBSERVATIONS AT 20° C.

| Perfume: Propellant Ratio | FORMULATION | | |
|---|---|---|---|
| | Perfume = GIANNE | Perfume = FLORALYS | Perfume = ORCHARD BLOSSOM |
| 90:10 | C | C | C |
| 80:20 | C | C | C |
| 70:30 | C | C | C |
| 60:40 | C | C | C |
| 50:50 | C | C | C |
| 40:60 | C | H | C |
| 30:70 | C | H | H |
| 20:80 | T | H | T |

Key:
C = Clear, free of any turbidity or separation
H = Hazy appearance, fine suspended particles
T = Turbid, solution readily separates, not transparent

Example A6

Composition:

Fragrance: SCJ 330109

Propellant: P28 (propane/butane blend at 28 psi at 21° C.)

| Perfume:Propellant Ratio | Observations at 20° C. |
|---|---|
| 90:10 | C |
| 80:20 | C |
| 70:30 | C |
| 60:40 | C |
| 50:50 | C |
| 40:60 | ST |
| 30:70 | T |
| 20:80 | T |

Key:
C = Clear
T = Turbid
ST = Slightly turbid

Example A7

Composition:

Fragrance=SCJ 330109

Propellant=P28 (propane/butane blend at 28 psi at 21° C.)

| Mass (g) Fragrance | Mass (g) Propellant | Mass (g) Cosolvent (100AGF3) | Observations at R.T. | O/N in Freezer |
|---|---|---|---|---|
| 4.0 | 4.0 | — | clear | turbid |
| 3.6 | 4.0 | 0.4 | clear | clear |
| 3.2 | 4.0 | 0.8 | clear | clear |
| 3.2 | 4.4 | 0.4 | clear | clear |

Example A8

Composition:
Fragrance: as given
Propellant: P28 (propane/butane blend at 28 psi at 21° C.)

OBSERVATIONS AT 20° C.

| Fragrance | 20% active w/w [g(active): g(propellant)= 1:4] | 15% active w/w [g(active): g(propellant)= 1:5.5] | 10% active w/w [g(active): g(propellant)= 1:9] |
|---|---|---|---|
| RF 1784 | clear | clear | hazy |
| PCV 1840 | clear | clear | clear |
| PCV 1838/2 | clear | clear | slightly hazy |
| Perfume Ambsol NC-91112 | clear | clear | clear |
| Lime Dist Mex. Oil P | clear | clear | clear |
| Lime Oil 11273 | clear | clear | clear |
| Analise NC90604 | clear | clear | clear |
| Spruce 64,796 | clear | clear | clear |
| Freesia 23243 | clear | clear | hazy |
| PC 621365 Litsea-Cubeba | clear | clear | clear |
| Compound 13,817/LSA | clear | clear | clear |
| Crematest fleurs | clear | clear | clear |
| Takaro 643,407 | clear | clear | clear |
| Fragrance RF 3889 | clear | clear | clear |
| Crematest Sport | clear | clear | clear |
| Shampoo PR Fr | clear | clear | hazy |
| Aureola 0/066450 | clear | hazy | hazy |
| Siana | clear | clear | clear |
| FN 60895 | clear | clear | clear |
| FN 60893 | clear | clear | clear |
| FN 60894 | clear | clear | clear |
| Hypofresh | clear | clear | clear |
| Cederwood Oil Virginia | clear | clear | clear |

The results of Examples A1–A8 show that adequate levels of perfumes can be delivered from space sprays wherein there is little or no cosolvent (although levels of cosolvent up to about 25% w/w based on the total composition or even higher can be employed). By contrast, in prior art compositions, it was necessary to use high ratios of propellant to perfume, far in excess of 1:1 and to increase the solvent level in order to increase the level of perfume.

B. INSECTICIDE EXAMPLES

In the case where the active ingredient is an insecticide, the following examples illustrate ranges of formulations possible within the scope of the invention.

These results can be compared to a prior art household insecticide formulation which conventionally comprises:

| Pyrethrins (active) | 0.3% w/w |
|---|---|
| Piperonyl Butoxide (pyrethroid synergist) | 1.5% w/w |
| ShellSolT (solvent) | 15.0% w/w |
| Trichloroethane (solvent) | 25.2% w/w |
| HLP58 Hydrocarbon (propellant) | 58.0% w/w | i.e., the active ingredient:propellant:solvent weight ratio is approximately 1:22:32.

In each of the examples given hereinbelow, the formulations were prepared in glass aerosols and their clarity examined after 24 hours.

Example B1

Insecticide: 50% KENYA PYRETHRUM EXTRACT

Synergist: 85% PIPERONYL BUTOXIDE (For the purposes of the tests summarized in the table below, the insecticide and the synergist were combined in a ratio of 1:4 by weight.)

Propellant: HCP58 HYDROCARBON

| % w/w Insecticide | % w/w Propellant | Solubility at 20° C. |
|---|---|---|
| 100 | 0 | clear |
| 90 | 10 | clear |
| 80 | 20 | clear |
| 70 | 30 | clear |
| 60 | 40 | clear |
| 50 | 50 | clear |
| 40 | 60 | clear |
| 39 | 61 | slight haze |
| 38 | 62 | slight haze |
| 37 | 63 | slight haze |
| 35 | 65 | slight haze |
| 30 | 70 | slight haze |
| 20 | 80 | turbid |
| 10 | 90 | turbid |
| 0 | 100 | clear |

Again, on the understanding that at least 15% w/w propellant is preferred in order that sufficient expansion energy is provided to the active ingredient, it can be seen that a composition suitable for use can comprise 30–90%, preferably 40–85%, w/w insecticide and, correspondingly, 70–10%, preferably 60–15%, w/w propellant.

Example B2

Insecticide: SUMETHRIN

Propellant: HCP58 HYDROCARBON

| % w/w Insecticide | % w/w Propellant | Solubility at 20° C. |
|---|---|---|
| 100 | 0 | clear |
| 90 | 10 | clear |
| 80 | 20 | clear |
| 79 | 21 | slight haze |
| 78 | 22 | slight haze |
| 76 | 24 | smoky |
| 70 | 30 | smoky |
| 60 | 40 | smoky |
| 50 | 50 | smoky |
| 40 | 60 | turbid |
| 30 | 70 | turbid |
| 20 | 80 | turbid |
| 10 | 90 | turbid |
| 0 | 100 | clear |

It can be seen that suitable compositions using these ingredients might comprise 78–90%, preferably 80–85%, w/w insecticide and 22–10%, preferably 20–15%, w/w propellant.

In order to test the effect of the presence of a solvent on this composition, 5% w/w ethanol was added to the composition. This amount of solvent enabled a solution of 50% w/w insecticide and 45% w/w propellant which was completely clear and thus suitable for use.

Example B3
Insecticide: BIORESMETHRIN/BIOALLETHRIN 1:5
Propellant: HCP58 HYDROCARBON

| % w/w Insecticide | % w/w Propellant | Solubility at 20° C. |
|---|---|---|
| 100 | 0 | clear |
| 90 | 10 | clear |
| 80 | 20 | clear |
| 70 | 30 | clear |
| 68 | 32 | clear |
| 66 | 34 | clear |
| 64 | 36 | clear |
| 63 | 37 | slightly turbid |
| 62 | 38 | slightly turbid |
| 60 | 40 | turbid |
| 50 | 50 | turbid |
| 40 | 60 | turbid |
| 30 | 70 | turbid |
| 20 | 80 | turbid |
| 10 | 90 | turbid |
| 0 | 0 | clear |

Satisfactory atomization of the insecticide is achieved with these ingredients in compositions having 62–90%, preferably 64–85%, w/w insecticide and 38–10%, preferably 36–15%, w/w propellant.

Addition of 10% w/w ethanol enabled a higher quantity of propellant to be dissolved in the insecticide.

Example B4

Insecticidal Composition: (E25/63/1)

| | % w/w | mass (g) |
|---|---|---|
| pyrethrum extract (50%) | 20.0 | 20.0 |
| piperonyl butoxide (85%) | 80.0 | 80.0 |
| | 100.0 | 100.0 |

Propellant: P28 (propane/butane blend at 28 psi and 21° C.)
Co-solvent: 100 SGF6 (special grade 100% ethanol)

| Mass E25/63/1 (g) | Mass (g) Cosolvent (100 SGF6) | Mass (g) Propellant (P28) | Observations |
|---|---|---|---|
| 10.0 | — | — | clear |
| 9.0 | — | 1.0 | clear |
| 8.0 | — | 2.0 | clear |
| 7.0 | — | 3.0 | clear |
| 6.0 | — | 4.0 | clear |
| 5.0 | — | 5.0 | clear |
| 4.0 | — | 6.0 | clear |
| 3.0 | — | 7.0 | slight haze |
| 2.0 | — | 8.0 | turbid |
| 1.0 | — | 9.0 | turbid |
| — | — | 10.0 | clear |
| 3.5 | — | 6.5 | slight haze |
| 3.7 | — | 6.3 | slight haze |
| 3.8 | — | 6.2 | slight haze |
| 3.9 | — | 6.1 | slight haze |
| 4.0 | — | 6.0 | clear |
| 2.0 | 1.0 | 7.0 | slight haze |
| 2.0 | 1.5 | 6.5 | slight haze |
| 2.0 | 1.8 | 6.2 | slight haze |
| 2.0 | 1.9 | 6.1 | slight haze |
| 2.0 | 2.0 | 6.0 | clear |

For these ingredients, usable aerosols were prepared at ratios of 30–90%, preferably 40–85%, w/w insecticide and, correspondingly, 70–10%, preferably 60–15% w/w propellant. With this combination of ingredients, when cosolvent was employed, the amount of insecticide was reduced by the amount of solvent added, and the ratio of propellant to insecticide was increased accordingly.

C. EFFICACY

Example C1

In order to test the efficacy of the compositions according to the invention, the composition described in Example B1, having a ratio of 50% w/w insecticide blend to 50% w/w propellant was packaged in a 10 mg aluminum aerosol can fitted with a 150 mg metering valve.

Methods

For these tests, 5 replicates only were carried out for the Example B1 formulation using the CERIT Modified Hunting Mode protocol—"CERIT/HF-HM/FIK 2.0"—modified for manual operation and to allow the aerosol plume of the formulation to envelop the fly release cage fully, as described below.

MODIFIED HUNTING NODE PROTOCOL-AEROSOL CHAMBER TESTS-CERIT/HF-HM/FIK 2.0

Hunting Mode
  Insects released to fly through the spray cloud, to simulate field use where the operator "aims at" the target(s), i.e., the "Hunting" method.
Order of Testing
  The order of testing of formulations was chosen on a randomized block basis. Each formulation, including controls, was tested in each block; each block being completed on one day.
  Five replicates of each test were run.
Controls
  One run in each replicate block, without aerosol spray.
Insects
  Houseflies—*Musca domestics*
  Strain—"SYD 90", field collected 1990, from Sydney, Australia, various areas.
  Resistance status—susceptible (equivalent to SYD 88)
  Pre-fed sugar only, no protein.
  Age at time of test—3 to 7 days.
  Sex—mixed.
  Transferred directly from cage to release container without anesthesia.
  Numbers used per test—approximately 50.
Sprays
  Formulation—supplied as a very small aerosol.
  Spray rate—pre-calibration of aerosol before use; aerosol shaken (inverted) immediately before spraying.
  Spray start—at time zero.
  Spray duration—manually.
  Weight sprayed—0.08 g.
Insect Release
  Released into chamber—mechanically, under computer control, 0.8 m in front of, and 20 cm above, nozzle.
  Time of release—2 seconds.
K.D. Counts
  Counting—visually.
  Times of counts (from time zero) in seconds:
    30, 60, 90, 120, 150, 180, 240, 360, 480, 720.
Evacuation of Aerosol
  Vents opened and exhaust fan on for 15 minutes after each test.
Recording
  Computer, disk and printout.

Preliminary Analyses

Log dose/probit analysis—a modified program.

$KDT_{50}s$ and 95% confidence limits are determined.

Data then subjected to analysis of variance program and Student-Newman Keuls test.

Mortality

Insects held in containers provided with sugar and water for 24 hour counts of mortality.

The modifications to this protocol for the purposes of this example were as follows:

1. a reduction in spraying distance from 1.8 m to 0.8 m because of the low plume projection or "throw" of the formulation;
2. a reduction in the standard 2 g delivery of insecticide to a metered dose delivery of approximately 0.08 g; and
3. manual actuation of the formulation instead of computer-controlled actuation.

Analyses

The times for 50% of the insects to be knocked down ($KDT_{50}s$) were calculated by probit analysis (Finney, D. J., 1971. *Probit Analysis*. 3rd ed. Cambridge Univ. Press, London. 333 pp). Analysis of variance (ANOVA-Sokal and Rohlf "Biometry", Freeman, 1981) was applied to the $KDT_{50}s$ for all formulations.

Results

TABLE 1

$KDT_{50}s$ (sec) and the 24 hour mortalities (%) for Modified Hunting Mode, 1 metered dose per run = 0.08 g spray, 2 second release.

| Formulation | Mean $KDT_{50}$ (sec) | 95% C-Limits (sec) | Mean Mortality (%) |
|---|---|---|---|
| Supersol | 116 | 108–124 | 100 |

In the tests for Modified Hunting Mode, the formulation of Example B1 was effective in the knockdown and kill of Musca domestica, where a $KDT_{50}$ of 116 seconds and 100% mortality was achieved (from Table 1).

Based on the efficacies of formulations that are available on the market, the results for the formulation of Example B1 are comparable with mid-range products, i.e., total knockdown and mortality (100%) is achieved within 2 minutes of spraying.

It is apparent from the examples given hereinabove that whereas in conventional household aerosols, solvent/insecticide weight ratios can be as high as 100:1 and propellant/insecticide weight ratios even higher, in the formulations of the instant invention, the solvent/insecticide weight ratio is generally less than 1:5 and often zero and the propellant/insecticide weight ratios are generally less than 1:1.

It is also therefore apparent that in accordance with these embodiments wherein the active ingredient is either an insecticide or a perfume, the delivery of one gram of active component is accompanied by the release of only one gram of VOC's, or even less. This represents a 100 fold reduction in VOC release in comparison to prior art formulations.

It is to be understood that the preceding examples are intended to illustrate but not limit the compositions and dispensers of the instant invention. It will be understood that the scope of the invention may include such active ingredients as anti-microbial agents and may be extended to include other solvents, adjuvants and propellants not specifically illustrated.

I claim:

1. A stable, liquid aerosol composition that is not an emulsion and that is effective as a space spray consisting essentially of about 10 to about 90% by weight of at least one active ingredient selected from the grour consisting of insecticides, perfumes, antimicrobial agents and mixtures thereof and about 90 to about 10% by weight of propellant, wherein the active ingredient is different from the propellant and wherein a substantial portion of said propellant is dissolved in said active ingredient.

2. An aerosol composition as claimed in claim 1 additionally comprising co-solvent, said propellant being dissolved in said active ingredient and cosolvent.

3. An aerosol composition as claimed in claim 2 wherein said propellant is selected from the group consisting of hydrocarbons, fluorocarbons, hydrofluorocarbons, hydrochlorofluorocarbons and dimethyl ether.

4. An aerosol composition as claimed in claim 1 wherein said active ingredient is present in an amount of about 20 to about 85% by weight and said propellant is present in an amount of about 80 to about 15% by weight.

5. An aerosol composition as claimed in claim 1 wherein said active ingredient consists of insecticide.

6. An aerosol composition as claimed in claim 1 wherein said active ingredient consists of perfume.

7. An aerosol composition as claimed in claim 1 wherein said active ingredient consists of insecticide and perfume.

8. An aerosol composition as claimed in claim 1 wherein said propellant is selected from the group consisting of hydrocarbons, fluorocarbons, hydrofluorocarbons, hydrochlorofluorocarbons and dimethyl ether.

9. An aerosol composition as claimed in claim 1 which is water-free.

10. The aerosol composition as claimed in claim 9 additionally containing from about 1 to about 25% by weight of a cosolvent, said propellant being dissolved in said active ingredient and cosolvent.

11. In a dispenser for space spraying an aerosol composition consisting essentially of:
a) a container:
b) a stable, liquid aerosol composition disposed within said container; and
c) a metering device operatively connected to said container for space spraying a metered amount of said aerosol composition,
the improvement wherein said stable, liquid aerosol composition is not an emulsion, is effective as a space spray, and consists essentially of about 10 to about 90% by weight of at least one active ingredient selected from the group consisting of insecticides, perfumes, antimicrobial agents and mixtures thereof and about 90 to about 10% by weight of propellant, wherein the active ingredient is different from the propellant and wherein a substantial portion of said propellant is dissolved in said active ingredient.

12. The dispenser of claim 11 wherein said aerosol composition additionally comprises co-solvent, said propellant being dissolved in said active ingredient and co-solvent.

13. The dispenser of claim 12 wherein said propellant is selected from the group consisting of hydrocarbons, fluorocarbons, hydrofluorocarbons, hydrochlorofluorocarbons and dimethyl ether.

14. The dispenser of claim 11 wherein said active ingredient is present in an amount of about20 to about 85% by weight and said propellant is present in an amount of about 80 to about 15% by weight.

15. The dispenser of claim 11 wherein said active ingredient consists of an insecticide.

16. The dispenser of claim 11 wherein said active ingredient consists of a perfume.

17. The dispenser of claim 11 wherein said active ingredient consists of insecticide and perfume.

18. The dispenser of claim 11 wherein said propellant is selected from the group consisting of hydrocarbons, fluorocarbons, hydrofluorocarbons, hydrochlorofluorocarbons and dimethyl ether.

19. The dispenser or claim 11 wherein said aerosol composition is water-free.

20. The dispenser of claim 19 wherein said aerosol composition also contains from about 1 to about 25% by weight of a cosolvent, said propellant being dissolved in said active ingredient and cosolvent.

21. An aerosol composition as claimed in claim 1 which includes pyrethrin insecticide.

22. An aerosol composition as claimed in claim 1 which includes pyrethroid insecticide.

23. The dispenser of claim 11 wherein said composition includes pyrethrin insecticide.

24. The dispenser of claim 11 wherein said composition includes pyrethroid insecticide.

25. An aerosol composition as claimed in claim 1 which is an air freshener which includes a perfume.

26. The dispenser of claim 11 wherein said composition is an air freshener which includes a perfume.

* * * * *